United States Patent [19]

Sheesley

[11] 3,730,008

[45] May 1, 1973

[54] DISENGAGEABLE SLIDE NUT

[75] Inventor: John M. Sheesley, Houston, Tex.

[73] Assignee: Research Engineering Company, Houston, Tex.

[22] Filed: May 27, 1971

[21] Appl. No.: 147,419

[52] U.S. Cl. ............................ 74/89.15, 74/424.8 A
[51] Int. Cl. ............................................... F16h 27/02
[58] Field of Search ..................... 74/89.15, 424.8 A

[56] References Cited

UNITED STATES PATENTS

| 1,721,227 | 7/1929 | Manley | 74/424.8 A |
|---|---|---|---|
| 3,575,378 | 4/1971 | Fawkes | 74/89.15 |
| 348,226 | 8/1886 | Mayhew | 74/89.15 |
| 980,804 | 1/1911 | La Rue | 74/424.8 A |
| 1,408,280 | 2/1922 | Fahrlander | 74/424.8 A |

FOREIGN PATENTS OR APPLICATIONS 856,721  12/1960  Great Britain........................74/89.15

Primary Examiner—Charles J. Myhre
Assistant Examiner—Wesley S. Ratliff, Jr.
Attorney—Robert W. B. Dickerson

[57] ABSTRACT

A device for translating rotary motion of one member into linear motion of another. It includes a rotating member, such as a screw, which is removably engageable with a threaded partial nut. On engagement, screw rotation causes linear nut movement. This movement may be used to control motion of further devices.

7 Claims, 3 Drawing Figures

Patented May 1, 1973 3,730,008

John M. Sheesley
INVENTOR.

BY [signature]

ATTORNEY

DISENGAGEABLE SLIDE NUT

BACKGROUND OF THE INVENTION

The number of uses for the conversion of one type motion, such as rotary, into another type, such as linear, is so large as to make itemization impossible. For example, see U.S. Pat. Nos. 462,762; 801,012; 2,902,885; 2,916,947 and 3,498,187. One such use lies in the development of actuators for valves. These actuators oftentime include manual overrides or supplemental manual controls for use in the event of power failure, or for other reasons. See application Ser. No. 68,427 filed Aug. 31, 1970. It is normally desirable to have these supplemental controls disengaged at other times. The device of this invention has as one of its objects the provision of just such a piece of equipment.

SUMMARY OF THE INVENTION

The general structure used to accomplish the objects of this invention, namely the conversion of rotary motion to linear, includes (a) rotatable threaded member, (b) means for imparting rotary motion for such a member, (c) a partial nut that is threaded, normally internally, substantially throughout the length of the partial portion; and means for causing engagement and disengagement of members "a" and "c" above.

DESCRIPTION OF PREFERRED EMBODIMENT

Figure 1:
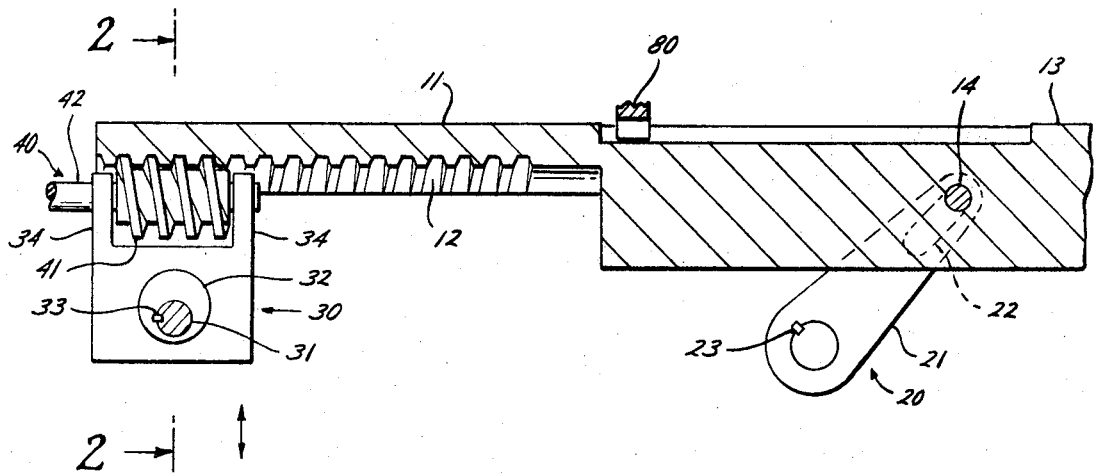
FIG. 1 is a partial section through the invention.
Figure 2:
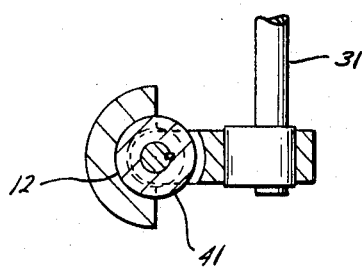
FIG. 2 is a section taken along lines 2—2 of FIG. 1.

It should initially be noted that while at least one particular area of utilization is hereinafter described, there are numerous other areas of applicability of this invention.

The drawings illustrate a rod member 11, which, for a certain portion of its length is cut away and interiorly threaded as at 12, to form a partial nut. The dimensions are not felt critical, i.e., the length of the threaded portion may be a function of the particular utilization, and the degree of arc of the threaded portion may vary. Enough material must remain to permit engagement by a screw member, as later described.

This rod would move linearly and thereby perform some work function. For example, use of the partial nut in a valve actuator is partially illustrated. Such an actuator may have a rotatable yoke 20 with arms 21 (only one illustrated), each having a slotted portion 22. At one end of the yoke, a valve stem may be received within and keyed to a cylindrical collar portion of the yoke, as at 23. Rod 11 would have a sliding block portion, which would include a transverse pin 14. This pin would extend within the aforementioned slotted portions. On reciprocation of the rod 11, pin 14 would cause rotation of yoke 20 and thereby of the associated valve stem.

Movement of rod 11 is caused by operation of the mechanism here described. It may first be noted that such movement may normally be caused by customary hydraulic means. This is not illustrated but may include a reciprocating piston and piston rod which rod may be joined to block 13. Although in actuator applications the override invention discussed herein may oftentimes serve a back-up function, it may also serve as the prime means of operation, and would have applications in other fields of utility.

A further yoke device 30 would be movably positioned opposite block portion 13. This yoke can be reciprocated in the direction of the arrows shown in FIG. 1. The particular means for effecting such reciprocation may take different forms, such as those illustrated in FIGS. 1 and 3. In FIG. 1, a rotatable pin 31 extends transverse of yoke 30, and through a cutaway portion 32 thereof. The yoke may be spring biased (not shown) toward block 11 (for engagement of the threaded member later described). Pin 31 may have a cam portion 33 which, on rotation, by a handle not shown, of member 31, causes disengagement. Rotatably positioned in arms 34 of yoke 30 is screw 40, which has a threaded or toothed portion 41 and an unthreaded lever portion 42. The threads of screw portion 41 and rod portion 12 obviously mate. When in engagement, rotation of the screw causes linear movement of rod 11, along with block 13 and pin 14. This results in rotation of the valve stem keyed at 23 to yoke 20. Obviously, screw 40 would be positioned in a housing (not shown) and restrained against linear movement perpendicular to the direction of the arrows in FIG. 1, by bearings provided in the housing. Likewise, rod 11 would be permitted only linear movement by bearing means provided such housing, such as by U-shaped bearing 80, only a portion of which is shown. Rotation of pin 31 will cause engagement of the two threaded portions by causing linear movement of yoke 30, in the direction of the arrows, as described.

Figure 3:
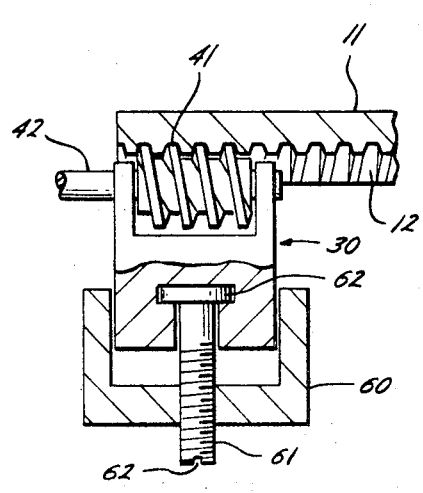
FIG. 3 is a sectional view illustrating modified means for causing engagement and disengagement.

Other embodiments of this yoke movement causing means are exemplified by that depicted in FIG. 3. FIG. 3 includes a block portion 60 threadedly receiving the shank 61 of a fastener, whose head 62 is received within the cross piece of yoke 30. Adjustment tool receiving means 62 would be provided for causing engagement or disengagement of the threaded portions of the screw and rod.

Although embodiments of the engagement and disengagement means have been shown, the device shown acts in a uniform manner. Rotation of screw 40 causes linear motion of rod 11. This linear movement may actuate some further piece of equipment, such as a valve-stem-associated yoke. A principal feature of this invention includes the provision of a partial nut, with which a screw is disengageably engageable. This feature provides quick engageability as well as permits savings in the fabrication of the mating parts.

It should be obvious that numerous modifications of this device are possible by one skilled in the art, without departing from the spirit of the invention, the scope of which is limited only by the following appended claims:

I claim:

1. A device for converting rotary motion of one member into linear movement of another member, comprising:

a traveling member movable only in a first linear direction, said traveling member including an interiorly threaded partial nut portion;

a screw member positioned for rotational movement, said screw member having a threaded portion matingly engageable with said traveling member's threaded portion; and means for causing linear motion of said screw member in a further direction perpendicular to said first direction thereby causing engagement and disengagement of said traveling and screw members' threaded portions.

2. The device of claim 1 and including means for causing oscillation of a yoke device on said traveling member moving linearly.

3. The device of claim 2 wherein said oscillation causing means includes a transverse pin carried by said traveling member.

4. The device of claim 1 wherein said screw member linear motion causing means includes a block portion rotatably receiving said screw member, and means for carrying said screw into and out of engagement with said partial nut.

5. The device of claim 4 wherein said engagement means includes a cam device engageable with said block.

6. The device of claim 4 wherein said engagement means includes a structure having a portion for passage therethrough of the shank of a fastener, and a fastener, said fastener having a head portion received by said block, and a shank passing through said passage portion.

7. A device for actuating a valve comprising:

Valve stem receiving means, said means including slotted arms;

pin member received by said slotted arms, said pin member received by a linearly movable rod, said rod including a threaded partial nut portion;

rotatable screw member having a threaded portion removably engageable with said partial nut portion, said screw member including means for causing rotation thereof; and means for causing movement of said screw member in a direction intersecting the direction of movement of said rod, thereby causing engagement and disengagement of said screw and partial nut portion.

* * * * *